United States Patent
Mizuta (10) Patent No.: US 8,305,684 B2
(45) Date of Patent: Nov. 6, 2012

(54) MICROSCOPE APPARATUS HAVING OPTICAL SYSTEMS FORMING OPTICAL PATHS PARALLEL TO AN OPTICAL AXIS OF AN OBJECTIVE LENS

(75) Inventor: Masahiro Mizuta, Yokohama (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 13/156,644

(22) Filed: Jun. 9, 2011

(65) Prior Publication Data
US 2011/0261445 A1 Oct. 27, 2011

Related U.S. Application Data

(63) Continuation of application No. PCT/JP2009/070943, filed on Dec. 16, 2009.

(30) Foreign Application Priority Data

Dec. 19, 2008 (JP) .................................. 2008-323463
Sep. 18, 2009 (JP) .................................. 2009-216524

(51) Int. Cl.
*G02B 21/18* (2006.01)
(52) U.S. Cl. ........................................ 359/372; 359/376
(58) Field of Classification Search ........................ None
See application file for complete search history.

(56) References Cited

U.S. PATENT DOCUMENTS

| | | | |
|---|---|---|---|
| 2004/0227989 A1 | 11/2004 | Obrebski et al. | |
| 2006/0072192 A1* | 4/2006 | Namii | 359/389 |
| 2007/0047073 A1 | 3/2007 | Zimmer et al. | |
| 2008/0030848 A1* | 2/2008 | Zimmer | 359/376 |
| 2009/0086313 A1 | 4/2009 | Zimmer et al. | |

FOREIGN PATENT DOCUMENTS

| | | |
|---|---|---|
| JP | 2001-66513 | 3/2001 |
| JP | 2004-255177 | 9/2004 |
| JP | 2007-65651 | 3/2007 |
| WO | 2006/37530 A1 | 4/2006 |

OTHER PUBLICATIONS

International Search Report for PCT/JP2009/070943, mailed Mar. 16, 2010.

* cited by examiner

*Primary Examiner* — Arnel C Lavarias
(74) *Attorney, Agent, or Firm* — Staas & Halsey LLP

(57) ABSTRACT

A microscope apparatus configured to enlarge entrance pupils while maintaining the rotational symmetry of optical systems of a plurality of optical paths after ejection of light from an objective lens to bring out the performance of the objective lens. A microscope apparatus includes an objective lens having a function of collecting light from the object; and optical paths in which all lens groups are rotational symmetric systems and through which light exited from the objective lens passes, wherein when a sum of maximum diameters of entrance pupils of optical systems forming any two of the optical paths is set as $\Sigma Di$, and an axial luminous flux diameter determined from a maximum aperture angle $\alpha$ and a focal distance f of the objective lens is set as Dobj, a condition of the following expression is satisfied, $\Sigma Di > Dobj$ where $Dobj = 2 \cdot f \cdot \sin \alpha$.

15 Claims, 12 Drawing Sheets

(a) PSF CROSS-SECTIONAL VIEW OF X-AXIS (b) PSF CROSS-SECTIONAL VIEW OF Y-AXIS

MICROSCOPE APPARATUS HAVING OPTICAL SYSTEMS FORMING OPTICAL PATHS PARALLEL TO AN OPTICAL AXIS OF AN OBJECTIVE LENS

CROSS REFERENCE TO RELATED APPLICATIONS

This application is a continuation application, filed under 35 U.S.C. §111(a), of International Application PCT/JP2009/070943, filed Dec. 16, 2009, which claimed priority to Japanese Application Nos. 2008-323463, filed Dec. 19, 2008 and 2009-216524, filed Sep. 18, 2009, the disclosures of which are hereby incorporated by reference.

TECHNICAL FIELD

The present invention relates to a microscope apparatus.

BACKGROUND ART

A stereoscopic microscope as an example of a microscope apparatus can stereoscopically observe an object with protrusions and recesses as if the object is viewed by both eyes. Therefore, a distance relationship between a tool, such as tweezers, and an object can be easily recognized in an operation with the microscope. Thus, the stereoscopic microscope is particularly effective in a field that requires precise procedures, such as precision machinery industry and anatomy or surgery of living organisms. In such a stereoscopic microscope, an optical system that guides the luminous flux entering left and right eyes is at least partially separated to cause the optical axes to intersect over the surface of the object to obtain a parallax for stereoscopically observing the object. Enlarged images of the object viewed from different directions are created, and the images are observed through an eyepiece to stereoscopically view a minute object. An example of a typical configuration of the stereoscopic microscope includes a parallel stereoscopic microscope. The parallel stereoscopic microscope (parallel single-objective binocular microscope) includes one objective lens and two observation optical systems for right and left eyes arranged parallel to the optical axis of the objective lens. In this case, the objective lens that has brought the focus position in line with the surface of the object plays a role of guiding the parallel luminous flux to the following variable power lens groups for left and right eyes. The parallel luminous flux ejected from the objective lens is divided into two optical paths (variable power lens groups or observation optical systems) and is separately delivered to the left and right eyes.

In the parallel stereoscopic microscope, the observation optical system divides the light collected by the objective lens into two optical paths, and the effective diameter is about half the objective lens. Accordingly, the resolving power is also approximately halved, and the optical performance of the objective lens cannot be fully utilized. Therefore, a microscope apparatus is developed, in which incident effective diameters of left and right observation optical systems are differentiated to improve the resolving power of only an optical system of one side to acquire a high-resolution image (for example, see Patent Literature 1).

CITATION LIST

Patent Literature

[Patent Literature 1] Japanese Patent Laid-Open No. 2007-065651

SUMMARY OF INVENTION

Technical Problem

However, according to the method of enlarging the incident effective diameter of one of two observation optical systems, there is a problem that although the resolving power of the observation optical system increases, the incident effective diameter of the other system needs to be reduced, and the resolving power is further reduced.

The present invention has been made in view of the problem, and an object of the present invention is to provide a microscope apparatus configured to enlarge entrance pupils while maintaining the rotational symmetry of optical systems of a plurality of optical paths after ejection of light from an objective lens to bring out the performance of the objective lens.

Solution to Problem

To solve the problem, a first present invention provides a microscope apparatus including, in order from an object side: an objective lens having a function of collecting light from the object; and two or more optical paths in which all lens groups are rotational symmetric systems and through which light exited from the objective lens passes, wherein when a sum of maximum diameters of entrance pupils of optical systems forming any two of the optical paths among the two or more optical paths is set as $\Sigma Di$, and an axial luminous flux diameter determined from a maximum aperture angle $\alpha$ and a focal distance f of the objective lens is set as Dobj, a condition of the following expression is satisfied, $$\Sigma Di > Dobj$$

where $Dobj = 2 \cdot f \cdot \sin \alpha$.

A second present invention provides a microscope apparatus including, in order from an object side: an objective lens having a function of collecting light from the object; and two or more optical paths through which the light exited from the objective lens passes, wherein when a sum of diameters passing through a center of the objective lens among maximum diameters of entrance pupils of optical systems forming any two of the optical paths among the two or more optical paths is set as $\Sigma Di'$, and an axial luminous flux diameter determined from a maximum aperture angle $\alpha$ and a focal distance f of the objective lens is set as Dobj, a condition of the following expression is satisfied, $$\Sigma Di' > Dobj$$

where $Dobj = 2 \cdot f \cdot \sin \alpha$.

A third present invention provides a microscope apparatus including, in order from an object side: an objective lens having a function of collecting light from the object; and two or more optical paths through which the light exited from the objective lens passes, wherein when maximum diameters of entrance pupils of optical systems forming any two of the optical paths among the two or more optical paths are set as Dep1 and Dep2, a sum of the maximum diameters of the two entrance pupils is set as $\Sigma Di''$, a distance between centers of the two entrance pupils is set as Dx, and an axial luminous flux diameter determined from a maximum aperture angle α and a focal distance f of the objective lens is set as Dobj, a condition of the following expression is satisfied, $$\Sigma Di'' > Dobj$$

$$Dx \geq Dep1$$

$$Dep1 = Dep2$$

where Dobj=2·f·sin α.

In the microscope apparatus, it is preferable that the number of the optical paths is 2. Alternatively, the number of the optical paths is 3.

In the microscope apparatus, it is preferable that the two or more optical paths are movable relative to the optical axis of the objective lens while a positional relationship of each other is maintained.

It is preferable that one of the two or more optical paths is movable to bring the optical axis of the optical system forming the optical path in line with the optical axis of the objective lens. It is preferable that the maximum diameter of the entrance pupil of the optical system forming the optical path including the optical axis that can be brought in line with the optical axis of the objective lens is the largest among the maximum diameters of the entrance pupils of the optical systems forming the two or more optical paths. It is preferable that one of the two or more optical paths is used as an illumination optical path.

It is preferable that one of the two or more optical paths is movable to completely include the entire entrance pupil of the optical system forming the optical path within the axial luminous flux diameter of the objective lens.

In the microscope apparatus, it is preferable that at least one of the two or more optical paths includes: afocal variable power optical systems that eject light, which is ejected substantially parallel to the optical axis of the objective lens from the objective lens, as a plurality of substantially parallel lights; and an imaging lens that collects the substantially parallel lights ejected from the afocal variable power optical system, and at least one of the afocal variable power optical systems includes, at least part of a section for changing the magnification from a high-power end state to a low-power end state, at least two lens groups that move to include components in a direction orthogonal to the optical axis of the objective lens.

Advantageous Effects of Invention

If the microscope apparatus according to the present invention is configured as described above, entrance pupils of optical systems can be enlarged while maintaining the rotational symmetry of the optical systems of a plurality of optical paths after ejection of light from an objective lens to bring out the performance of the objective lens.

DESCRIPTION OF EMBODIMENTS (First Embodiment)

Hereinafter, preferred embodiments of the present invention will be described with reference to the drawings. In a first embodiment, a case of dividing light exited from an objective lens into two optical paths will be described. First, a configuration of a parallel stereoscopic microscope will be described using FIG. 1. A parallel stereoscopic microscope 100 is a microscope apparatus with a single-objective binocular configuration and includes: a base unit (illumination unit) 101 including a transmitted illumination apparatus; a variable power lens barrel 103 provided with an objective lens and an eyepiece and including variable power lens groups (variable power optical systems) inside; and a focusing apparatus 105. A sample platform 102 embedded with a transparent member is provided on the upper surface of the base unit 101. The objective lens is attached to an objective lens attachment unit 106 provided below the variable power lens barrel 103. In the objective lens attachment unit 106, one of a plurality of predetermined low-power objective lenses and high-power objective lenses is selected and attached in some cases, and a plurality of lenses among a plurality of predetermined low-power objective lenses and high-power objective lenses are selected and attached in other cases.

Figure 1:
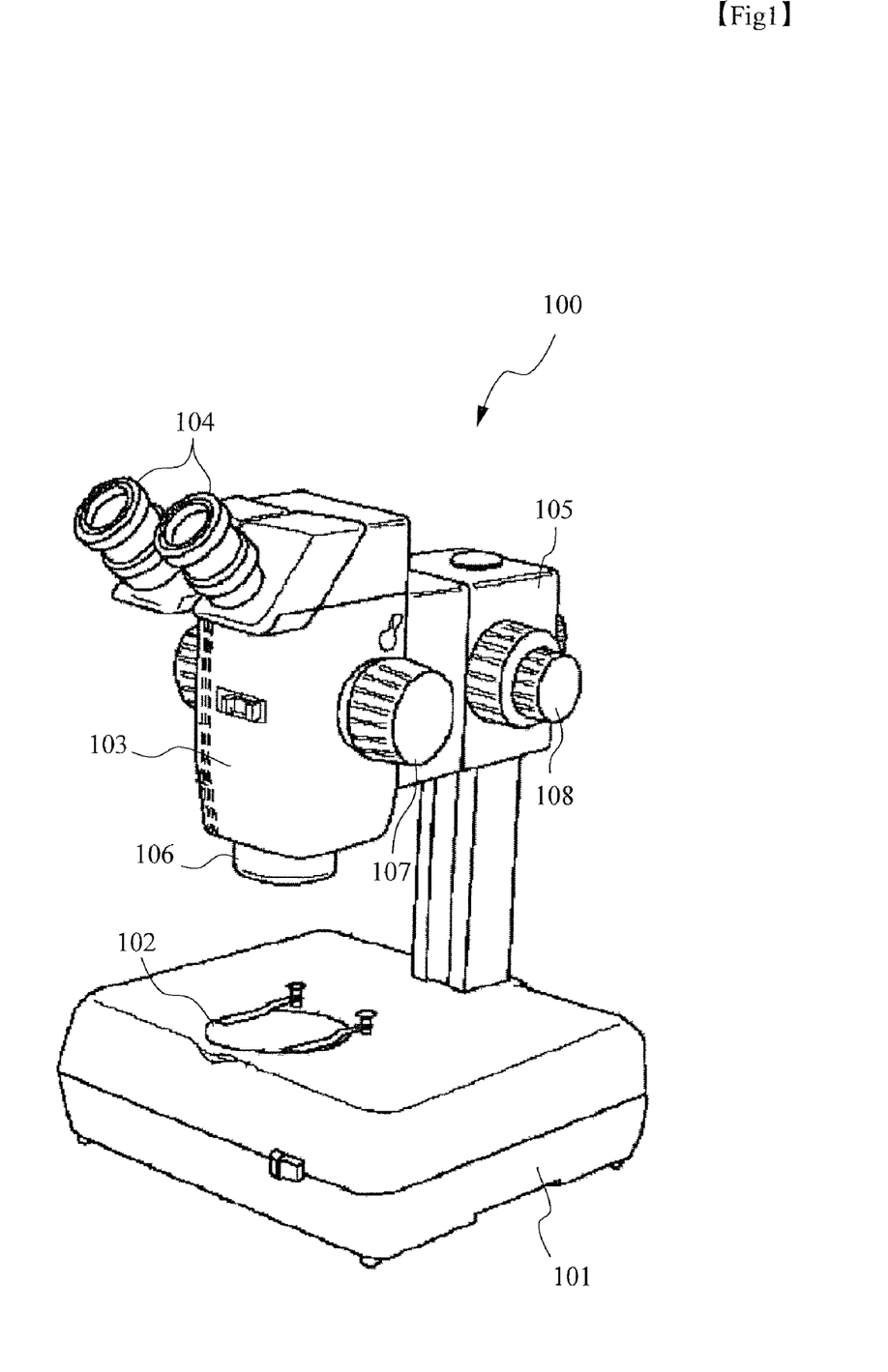
FIG. 1 is a perspective view showing an appearance of a parallel stereoscopic microscope.

Variable power lens groups for left eye and right eye are arranged inside the variable power lens barrel 103, and a variable power knob 107 is arranged outside the variable power lens barrel 103. The variable power lens groups include movable groups for changing the magnification, and as the variable power knob 107 is rotated, the variable power lens groups move in an optical axis direction in accordance with a predetermined amount of movement. The variable power lens groups include adjustable diaphragms, and an adjustment mechanism of the adjustable diaphragms is arranged in the variable power lens barrel 103. The focusing apparatus 105 includes a focusing knob 108 and a mechanism unit (not shown) that vertically moves the variable power lens barrel 103 along the axis based on the rotation of the focusing knob 108. Binocular lens barrels 104 including imaging lenses and eyepieces are attached above the variable power lens barrel 103. The imaging lenses arranged on the left and right collect the parallel light exited from the variable power lens groups for left and right eyes to temporarily form images of the sample, and the eyepieces attached to upper end sections of the binocular lens barrels 104 can be used to observe the formed images by the naked eye.

Figure 2:
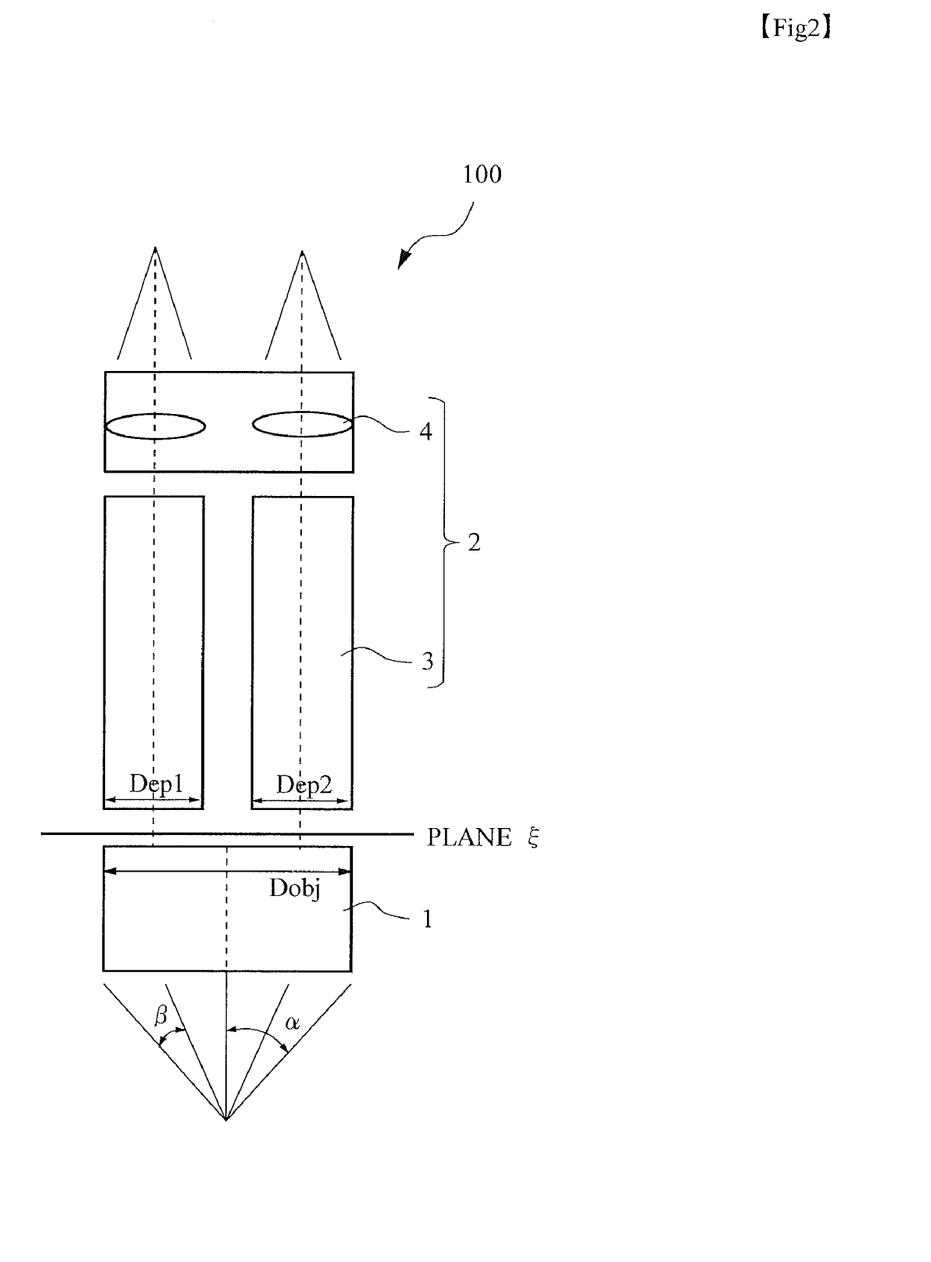
FIG. 2 is an explanatory view showing a configuration of an optical system of a microscope apparatus according to a first embodiment.

FIG. 2 shows a configuration of an optical system of the parallel stereoscopic microscope 100 with the single-objective binocular configuration. As described, the parallel stereoscopic microscope 100 includes, in order from the object side, an objective lens 1 and two optical paths for right eye and left eye that are arranged parallel to the optical axis of the objective lens 1 and that include optical axes different from (do not match) the optical axis of the objective lens 1 (hereinafter, the optical paths will be called "observation optical systems 2"). In the parallel stereoscopic microscope 100 shown in FIG. 2, each of the two observation optical systems 2 includes an afocal variable power lens group 3 and an imaging lens 4. In the parallel stereoscopic microscope 100, the objective lens 1 that has focused the surface of the object plays a role of guiding the afocal luminous flux to the following variable power lens groups 3 for left and right eyes. The parallel luminous flux radiated from the object and ejected from the objective lens 1 is divided into the two variable power lens groups 3, and the luminous flux diameter is changed. The imaging lenses 4 then form enlarged images of the object, and a minute object can be stereoscopically viewed by separately observing the images by left and right eyes through eyepieces not shown. Therefore, the numerical aperture that determines the resolving power of the parallel stereoscopic microscope 100 is not an axial ray angle α entering the objective lens 1, but is an angle β based on the optical axes of the variable power lens groups 3 inclined to the surface of the object. Meanwhile, the luminous flux is not divided in a normal optical microscope, and the numerical aperture is defined by the angle α.

Figure 3:
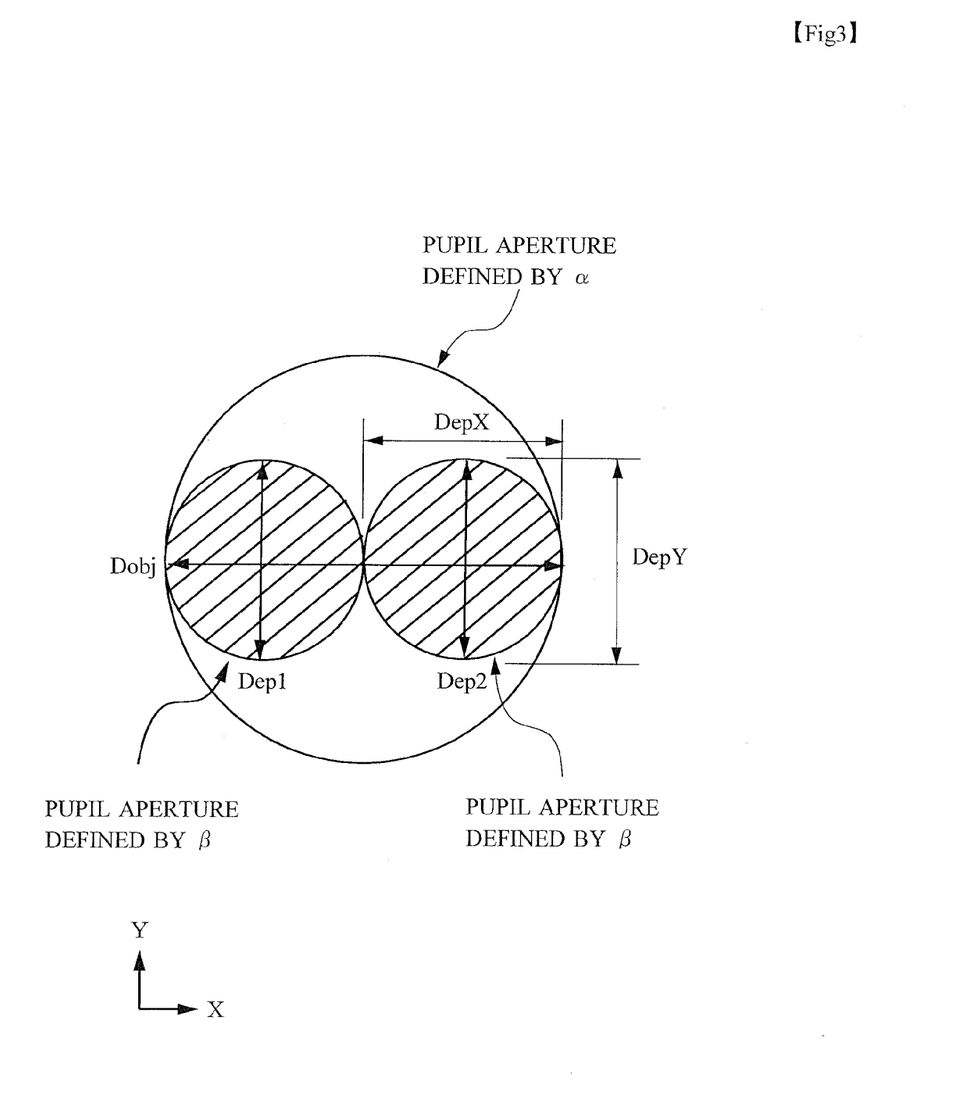
FIG. 3 is an explanatory view showing a pupil aperture defined by an objective lens and pupil apertures defined by variable power lens groups in a conventional microscope.

Entrance pupils of the variable power lens groups (variable power optical systems) 3 in the parallel stereoscopic microscope are the largest when the magnification is the highest power, and the entrance pupil diameters are substantially equal to the lens effective diameters closest to the objective lens 1 (equivalent to Dep1 and Dep2 of FIG. 2). Therefore, the maximum diameters of the entrance pupils of the two variable power lens groups 3 will be indicated as Dep1 and Dep2 in the following description. FIG. 3 shows pupil apertures of the objective lens 1 and the variable power lens groups 3 in a plane ξ shown in FIG. 2 in a conventional stereoscopic microscope, and only shaded sections enter the left and right variable power lens groups 3 in an ejected axial luminous flux diameter of the objective lens 1 indicated by a circle with a diameter Dobj. More specifically, if the incident effective diameters Dep1 and Dep2 of the two variable power lens groups 3 are equal, the angle β is approximately half the angle α. Therefore, if the objective lens 1 that is the same as a normal optical microscope is mounted on the parallel stereoscopic microscope 100, the resolving power of the parallel stereoscopic microscope 100 is approximately half that of the normal optical microscope.

In the first embodiment, the lens effective diameters Dep1 and Dep2 of the two variable power lens groups (variable power optical systems) 3 closest to the objective lens 1 are designed to satisfy the following conditional expression (1) relative to the axial luminous flux diameter Dobj by which the axial light emitted from the intersection between the sample surface and the optical axis of the objective lens 1 is ejected from the objective lens 1. It is assumed that the effective diameters Dep1 and Dep2 of the variable power lens groups 3 satisfy the following expression (2) (therefore, the effective diameters are the same).

$$Dep1 + Dep2 > Dobj \quad (1)$$

$$Dep1 = Dep2 \quad (2)$$

Figure 4A:
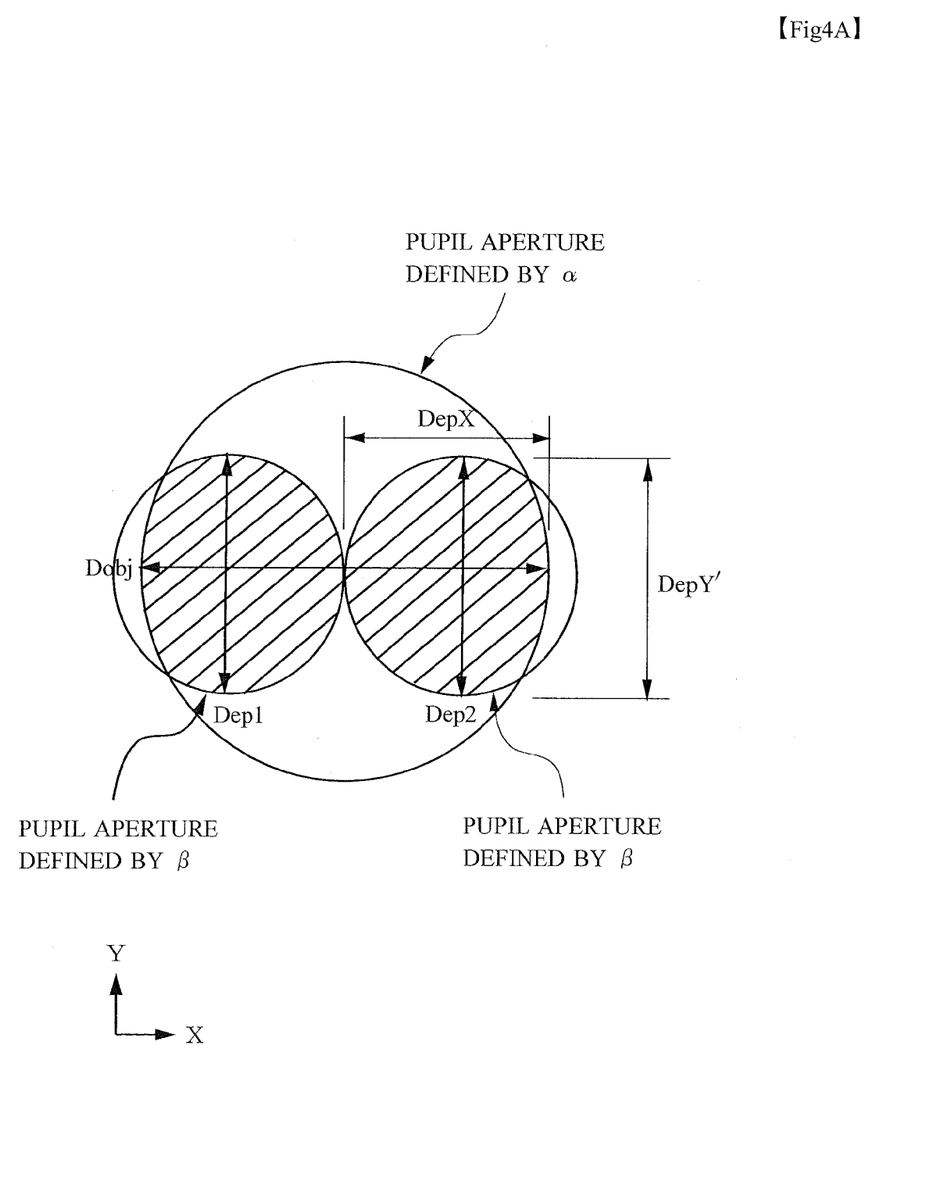
FIG. 4A is an explanatory view showing a pupil aperture defined by an objective lens and pupil apertures defined by variable power lens groups in a microscope apparatus according to the first embodiment.

FIG. 4A shows pupil apertures of the objective lens 1 and the variable power lens groups 3 in the plane ξ shown in FIG. 2 when the objective lens 1 and the two variable power lens groups 3 satisfy the expressions (1) and (2). In the ejected axial luminous flux diameter of the objective lens 1 indicated by a circle with the diameter Dobj, only the sections (shaded sections) that overlap with the circles with the diameters Dep1 and Dep2 enter the left and right variable power lens groups 3. In this case, Dobj is defined by the following expression (3) based on α shown in FIG. 2 and a focal distance f of the objective lens 1 and is substantially the same as the ejection-side effective diameter of the objective lens 1.

$$Dobj = 2 \cdot f \cdot \sin \alpha \quad (3)$$

Figure 5:
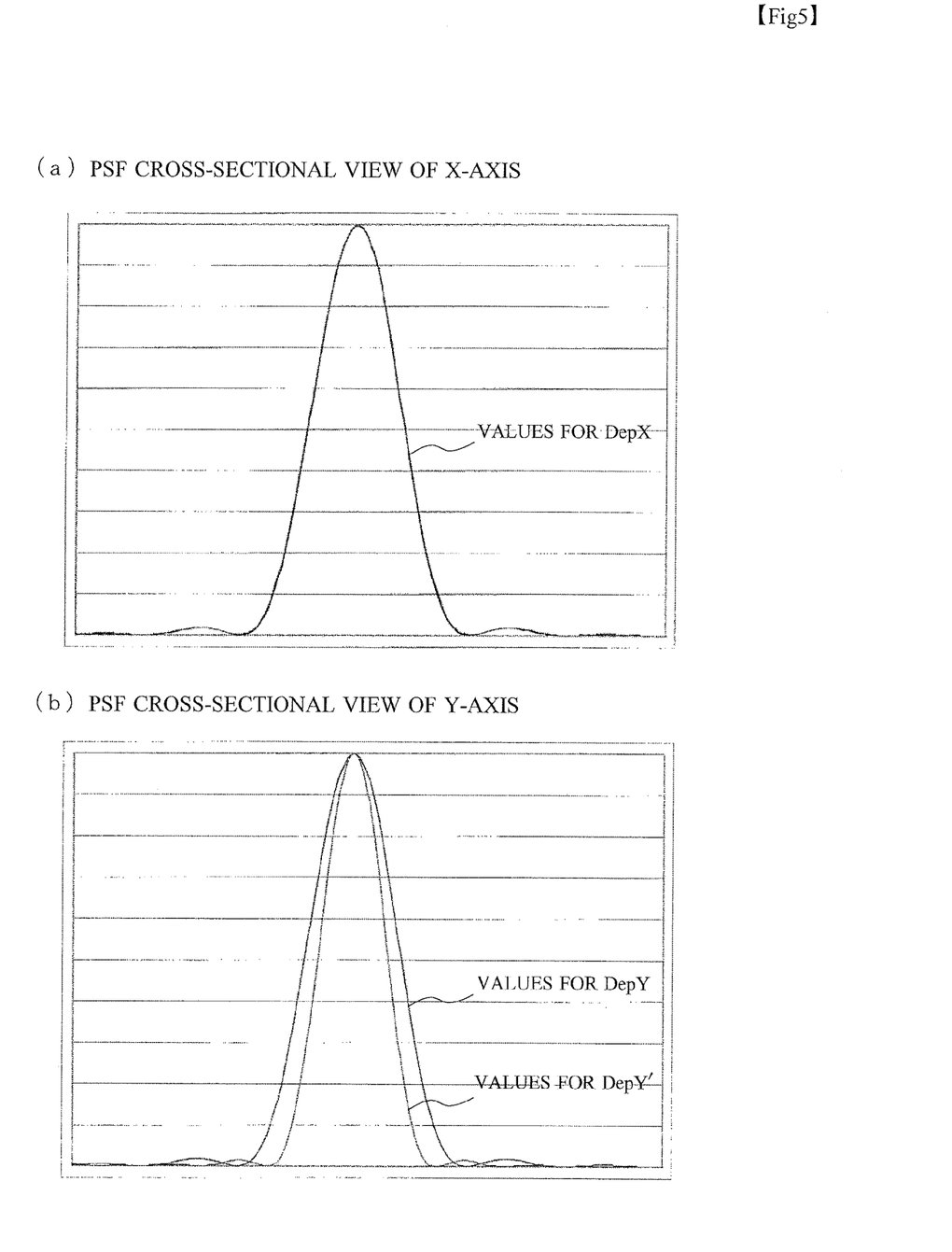
FIG. 5 shows PSF cross-sectional views in the microscope apparatus according to the first embodiment, (a) being a cross-sectional view in an X-axis direction, (b) being a cross-sectional view in a Y-axis direction.

Assuming a direction that the two variable power lens groups 3 are lined up (direction connecting the optical axes of the variable power lens groups 3) is an X axis and a direction orthogonal to the X axis is a Y axis in FIG. 4A, aperture shapes of the pupil apertures defined by β are not optical-axis symmetric (point symmetric), but are Y-axis symmetric (line symmetric). As a result, the resolving power varies depending on the direction. FIG. 5 displays, on top of each other, values of PSF (point image distribution function) in the conventional parallel stereoscopic microscope shown in FIG. 3 and values of PSF in the parallel stereoscopic microscope 100 according to the first embodiment shown in FIG. 4A (therefore, the parallel stereoscopic microscope 100 satisfying the expressions (1) and (2)). FIG. 5(*a*) is a PSF cross-sectional view of the X-axis direction in FIG. 4A, and FIG. 5(*b*) is a PSF cross-sectional view of the Y-axis direction in FIG. 4A. The PSF cross-sectional views are on the assumption that there is no aberration in the optical system of the parallel stereoscopic microscope 100. As is clear from FIGS. 3 and 4A, a pupil aperture diameter DepX in the X-axis direction is not different between the conventional parallel stereoscopic microscope and the parallel stereoscopic microscope 100 according to the first embodiment, and there is no change in the values of PSF. However, a pupil aperture diameter DepY' of the Y-axis direction in the first embodiment is larger than a pupil aperture diameter DepY in the conventional Y-axis direction, and the half width of PSF in the Y-axis direction is different. The half width of the parallel stereoscopic microscope 100 according to the first embodiment is smaller, and it can be recognized that the resolving power is increased.

In this way, according to the parallel stereoscopic microscope 100 of the first embodiment, the entrance pupils can be enlarged while maintaining the rotational symmetry of the optical systems (variable power lens groups 3) of the plurality of optical paths after ejection of light from the objective lens 1, and the performance of the objective lens 1 can be brought out.

Although a case of dividing the light exited from the objective lens 1 into two optical paths has been described in the above description, the conditional expression (1) is also effective when the light is divided into three or more optical paths. In that case, a sum $\Sigma Di$ of the maximum diameters of the entrance pupils of the optical systems forming any two optical paths among two or more optical paths needs to satisfy the condition of the following expression (4) relative to the ejected axial luminous flux diameter Dobj defined by the maximum aperture angle $\alpha$ and the focal distance f of the objective lens 1. In this case, all lens groups of two optical paths (observation optical systems 2) have rotational symmetric shapes.

$$\Sigma Di > Dobj \quad (4)$$

where $Dobj = 2 \cdot f \cdot \sin \alpha$

Figure 4B:
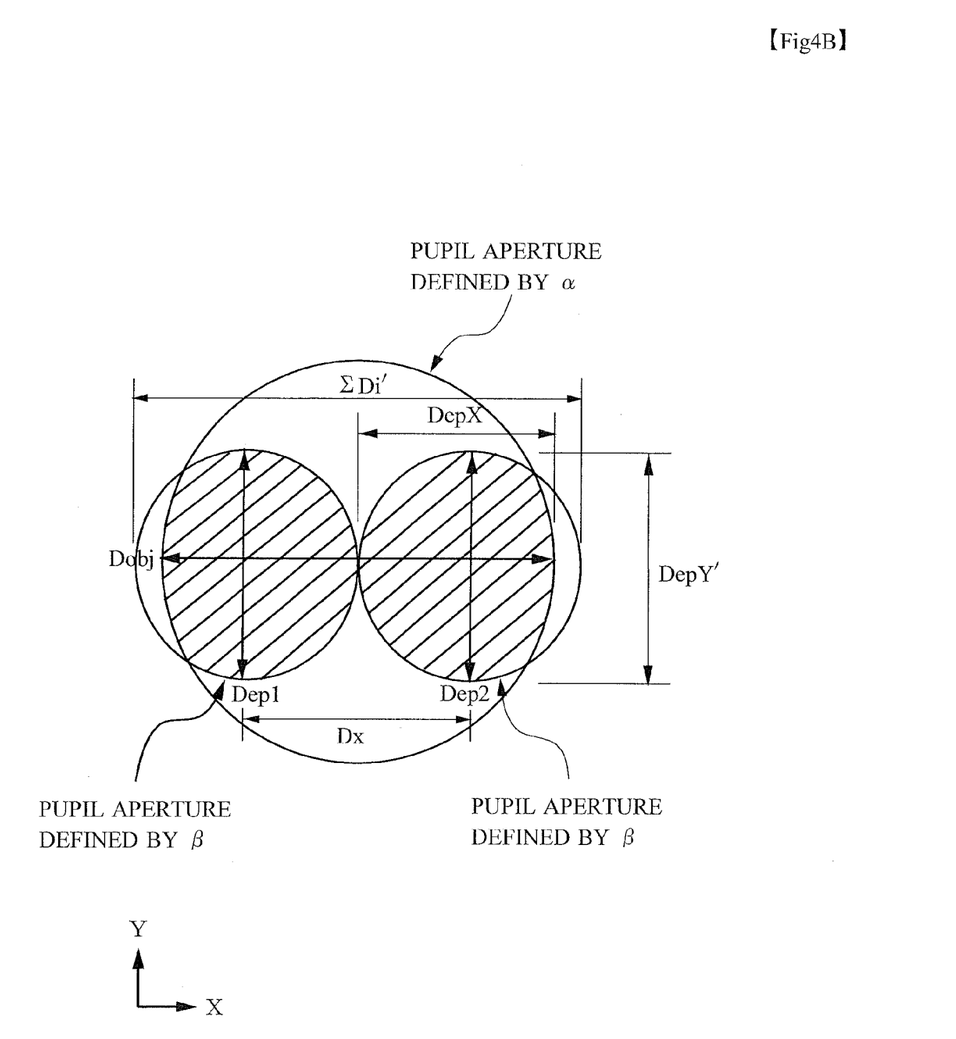
FIG. 4B is an explanatory view for showing a sum of maximum diameters of entrance pupils and a distance between the centers in the pupil aperture defined by the objective lens and the pupil apertures defined by the variable power lens groups.

Alternatively, a sum $\Sigma Di'$ of the diameters passing through the center of the objective lens 1 (see FIG. 4B) among the maximum diameters of the entrance pupils of the optical systems forming any two optical paths among two or more optical paths needs to satisfy the condition of the following expression (5) relative to the ejected axial luminous flux diameter Dobj determined from the maximum aperture angle $\alpha$ and the focal distance f of the objective lens 1.

$$\Sigma Di' > Dobj \quad (5)$$

where $Dobj = 2 \cdot f \cdot \sin \alpha$

Alternatively, when the maximum diameters of the entrance pupils of the optical systems forming any two optical paths among two or more optical paths are assumed as Dep1 and Dep2, a sum $\Sigma Di''$ of the maximum diameters of the two entrance pupils needs to satisfy the condition of the following expression (6) relative to the ejected axial luminous flux diameter Dobj determined from the maximum aperture angle $\alpha$ and the focal distance f of the objective lens 1, and a distance Dx between the centers of the two entrance pupils needs to satisfy the following expression (7). In this case, it is assumed that the maximum diameters Dep1 and Dep2 of the entrance pupils satisfy the following formula (8) (therefore, the diameters are the same).

$$\Sigma Di'' > Dobj \quad (6)$$

$$Dx \geq Dep1 \quad (7)$$

$$Dep1 = Dep2 \quad (8)$$

where $Dobj = 2 \cdot f \cdot \sin \alpha$ (Modified Example 1 of First Embodiment)

Figure 6:
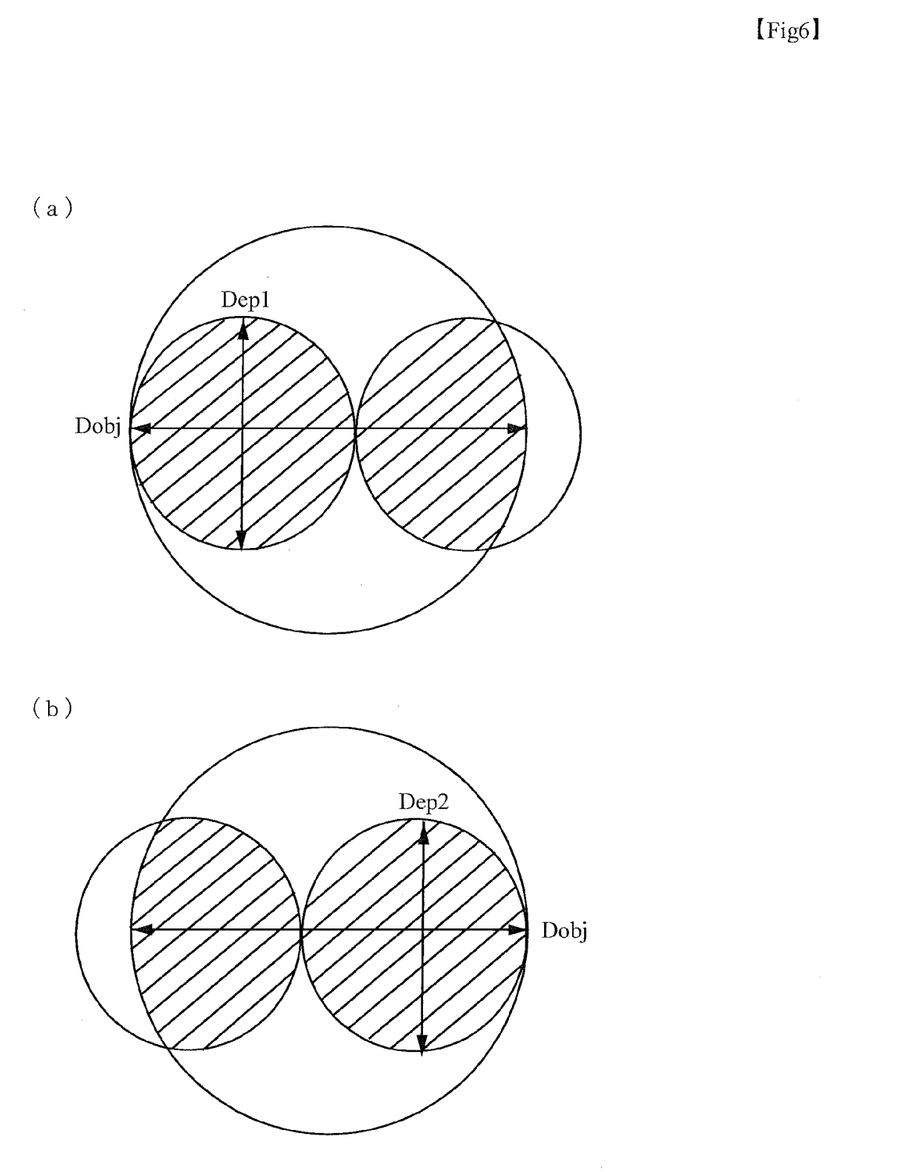
FIG. 6 shows explanatory views indicating the pupil aperture defined by the objective lens and the pupil apertures defined by the variable power lens groups in the microscope apparatus according to a modified example 1 of the first embodiment, (a) showing a case in which the entrance pupil of an optical path for right eye is included in an axial luminous flux diameter of the objective lens, (b) showing a case in which the entrance pupil of an optical path for left eye is included in the axial luminous flux diameter of the objective lens.

Although a case of symmetrically arranging the two observation optical systems 2 (variable power lens groups 3) in the X-axis direction of FIG. 4A relative to the optical axis of the objective lens 1 has been described in the above description, the entire variable power lens barrel 103 can be moved relative to the optical axis so that the axial luminous flux diameter Dobj of the objective lens 1 completely includes the entrance pupil of one of the two observation optical systems 2 as shown in FIG. 6 to increase the numerical aperture of at least the optical path of one side compared to the numerical aperture of the conventional parallel stereoscopic microscope apparatus in which the numerical aperture is limited to the distance between the optical axes. Particularly, if the axial luminous flux diameter Dobj of the objective lens 1 is designed to be able to include any one of the entrance pupils of the left and right optical paths (entrance pupil indicated by Dep1 or entrance pupil indicated by Dep2) as shown in FIGS. 6(*a*) and (*b*), any one of the left and right optical paths can be selected as an optical path with high numerical aperture depending on the dominant eye of the observer, and the convenience of the observer can be improved.

(Modified Example 2 of First Embodiment)

Figure 7:
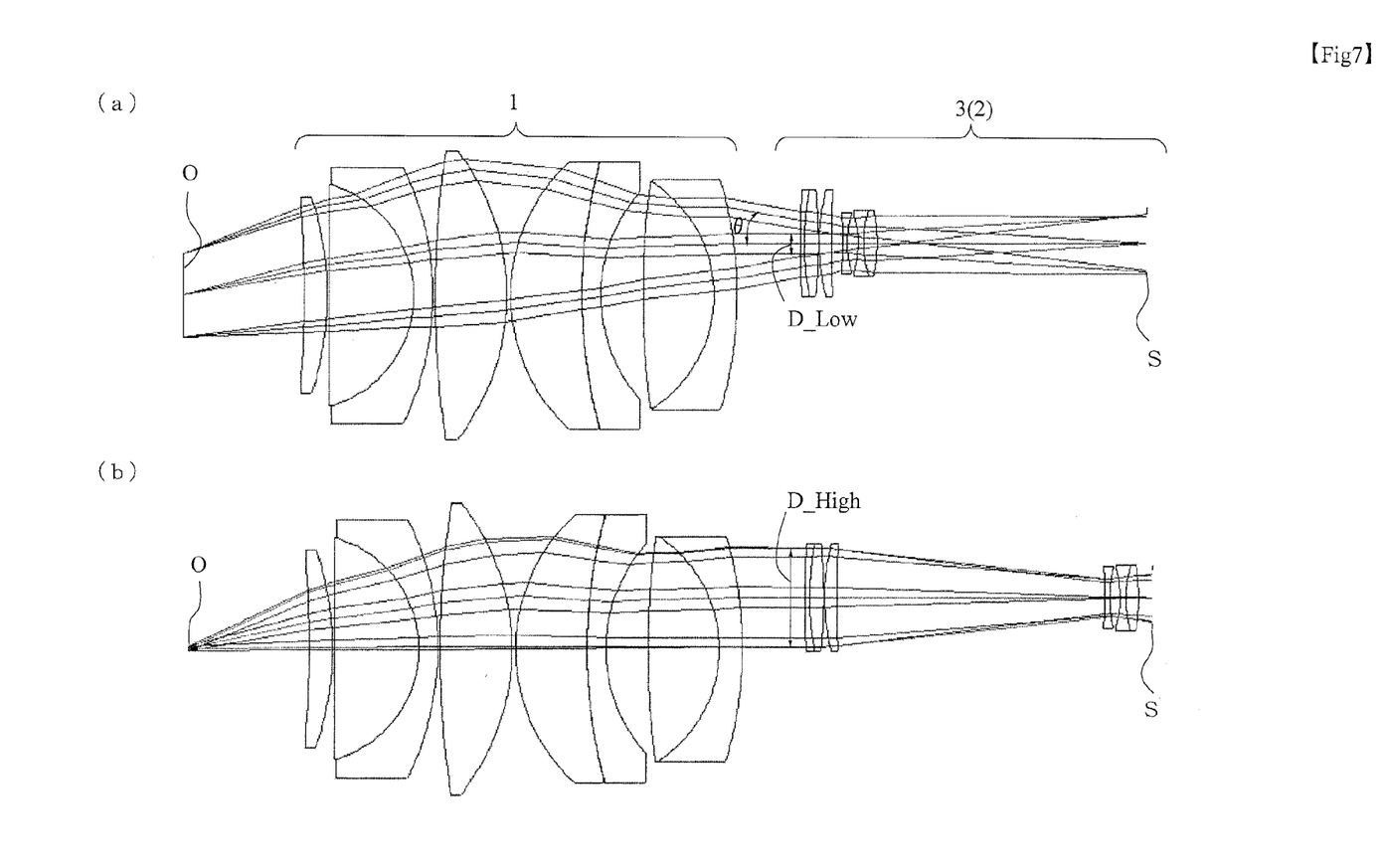
FIG. 7 shows cross-sectional views of an optical system of a conventional parallel stereoscopic microscope apparatus, (a) showing a low-power end state, (b) showing a high-power end state.

In recent years, demand for a stereoscopic microscope apparatus capable of observing a wide variable power range by one apparatus is increasing along with the diversification of applications. Particularly, there is a strong demand for the enlargement to the low-power range that allows viewing the entire image of a small animal or the like. FIG. 7 shows optical path diagrams of the objective lens 1 and the variable power lens group 3 of one side, and configurations in which the variable power lens group 3 in two different states of magnification is set to the same objective lens 1 are arranged above and below. FIG. 7(*a*) shows a low-power end state, and FIG. 7(*b*) shows a high-power end state. As is clear from FIG. 7, the position of the ray passing through the objective lens 1 is totally different during low-power and during high-power of the variable power lens group 3.

The magnification of the observation optical system 2 can be calculated by dividing a value f zoom, which is obtained by multiplying a focal distance of the imaging lens not shown in FIG. 7 by an afocal magnification of the variable power lens group 3, by a focal distance f obj of the objective lens 1. As is clear from the definition, the value f zoom needs to be reduced, or the focal distance f obj of the objective lens 1 needs to be increased to enlarge the variable power range to the low-power side. However, the increase in the focal distance f obj of the objective lens 1 leads to the enlargement of the objective lens 1, and the increase needs to be avoided. Consequently, the reduction in the value f zoom is inevitably required. An angle $\theta$ of the ray ejected from the objective lens 1 and entering the variable power lens group 3 relative to the optical axis (shown in FIG. 7(*a*)) is in accordance with an image height $y = f\ zoom \cdot \tan \theta$. Since the size of the image is constant, the angle $\theta$ increases if the value f zoom decreases. As is clear from FIG. 7(*a*), the main cause of the enlargement of the objective lens 1 is a light flux with large angle $\theta$. It can be recognized that the object side of the objective lens 1 is particularly enlarged. Although only one example will be described here, the ray on the low-power side (FIG. 7(*a*)) generally determines the size of the diameter on the object side of the objective lens 1, and the ray on the high-power side (FIG. 7(*b*)) determines the size of the diameter on the image side of the objective lens 1. The luminous flux on the high-power side is limited by the diameter of the lens positioned on the object side of the variable power lens group 3, and the luminous flux on the low-power side is limited by the diameter of the lens positioned on the image side of the variable power lens group 3. Therefore, an entrance pupil diameter D_Low on the low-power side decreases relative to an entrance pupil diameter D_High on the high-power side. Due to the forgoing reasons, the entrance pupil on the low-power side is small, and the angle $\theta$ of the ray inevitably becomes large. Since the expression (4) is satisfied in the present embodiment, the distance between optical axes is longer than that of the conventional parallel stereoscopic microscope apparatus. Consequently, the ambient light apart from the optical axis of the objective lens 1 is rejected if the size of the effective diameter of the objective lens 1 is maintained. On the high-power side, the entrance pupil diameter D_High is large, and the angle θ is small. Therefore, even if the luminous flux is limited by the diameter of the objective lens 1, only the amount of ambient light is reduced, and the field of view is not lost. However, on the low-power side, the entrance pupil diameter D_Low is small, and the angle θ is large as described above. Therefore, the limitation by the diameter of the objective lens 1 has a great impact. In some cases, not only the amount of ambient light is reduced, but also part of the field of view is completely lost.

Figure 8:
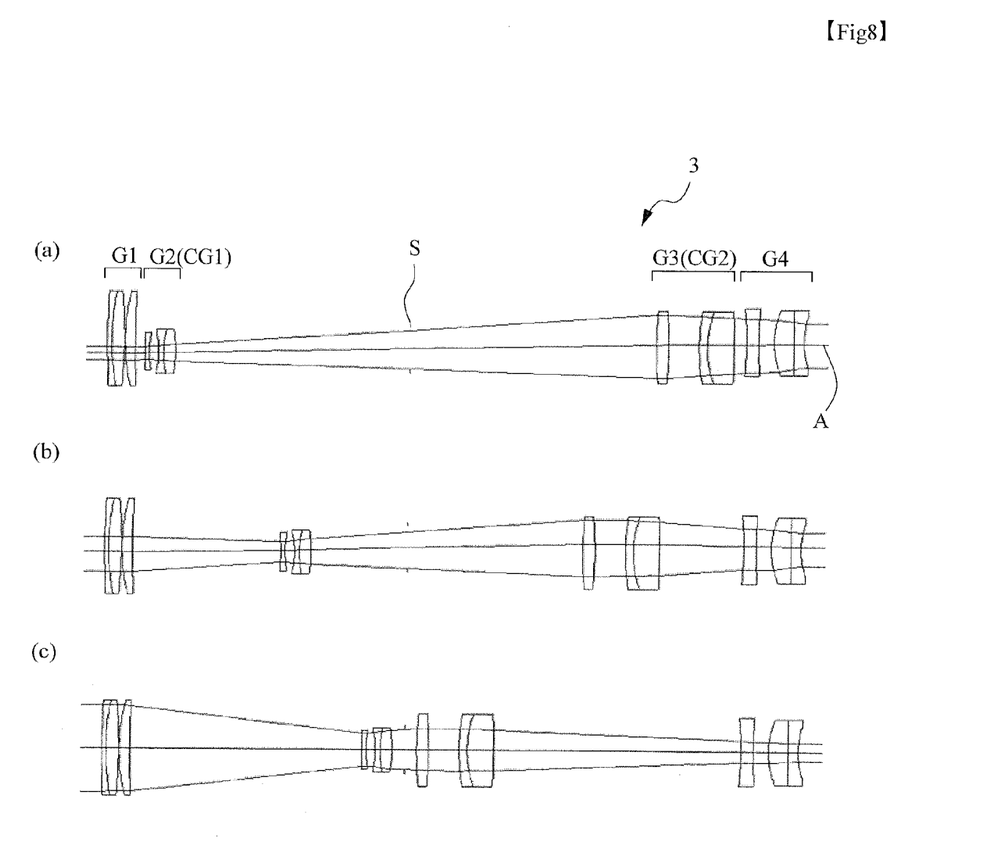
FIG. 8 shows cross-sectional views of a variable power lens group according to a modified example 2 of the first embodiment, (a) showing a low-power end state, (b) showing a medium-power state, (c) showing a high-power end state.

In the present modified example, a parallel stereoscopic microscope will be described in which at least one of the plurality of variable power lens groups 3 includes at least two lens groups that move to include components in a direction orthogonal to the optical axis of the objective lens 1 in at least part of the section for changing the magnification from the high-power end state to the low-power end state to prevent the ambient luminous flux in low-power from being rejected as shown in FIG. 8.

A case is illustrated in which the variable power lens group 3 arranged on the parallel stereoscopic microscope according to the present modified example includes four lens groups in total, a first lens group G1 with positive refractive power, a second lens group G2 with negative refractive power, a third lens group G3 with positive refractive power, and a fourth lens group G4 with negative refractive power, in order from the object side. In the variable power optical system 3, the second lens group G2 moves in a certain direction from the object side to the image side, and the third lens group G3 moves in a certain direction from the image side to the object side during the change in the magnification from the low-power end state (FIG. 8(a)) to the high-power end state (FIG. 8(c)). Therefore, the second lens group G2 and the third lens group G3 are designed to always move in certain directions only and not to move in reverse directions in the middle of the change in the magnification. A diaphragm S is arranged between the second lens group G2 and the third lens group G3. The first lens group G1 and the fourth lens group G4 are fixed during the change in the magnification.

In the parallel stereoscopic microscope, at least one of the lens groups constituting the variable power lens groups 3 is moved to include components in the vertical direction of the optical axis (hereinafter, the lens group will be called a "first correction lens group CG1"). More specifically, the optical axis of the first correction lens group CG1 is decentered relative to an optical axis A (for example, an optical axis of a fixed lens group (for example, the first lens group G1) among the lens groups included in the variable power lens group 3) as a basis of the variable power lens group 3. The first correction lens group CG1 may be at least one of the lens groups for which the magnification is changed by the movement along the optical axis during the change in the magnification, the first correction lens group CG1 may be at least one of the lens groups not moved along the optical axis during the change in the magnification, or the first correction lens group CG1 may be both (in FIGS. 8 and 9, the second lens group G2 for which the magnification is changed by the movement along the optical axis during the change in the magnification is set as the first correction lens group CG1).

Figure 9:
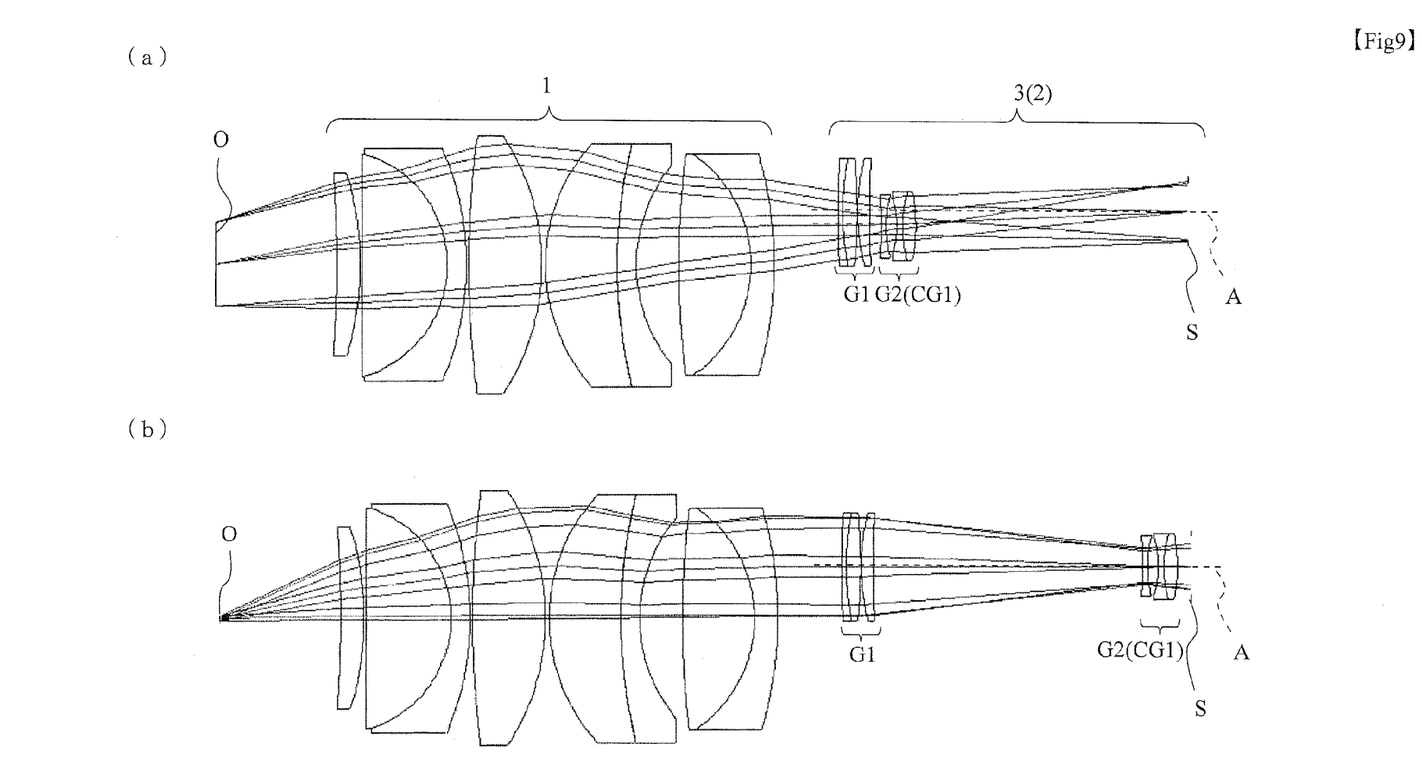
FIG. 9 shows cross-sectional views of an optical system of a parallel stereoscopic microscope according to the modified example 2 of the first embodiment, (a) showing a low-power end state, (b) showing a high-power end state.

As described, FIG. 9 shows the objective lens 1 and the variable power lens group 3 of one side arranged on the optical paths for left and right eyes. In the variable power lens group 3, some of the lens groups on the object side (the first lens group G1 fixed during the change in the magnification and the second lens group G2 moved during the change in the magnification) are illustrated. As shown in FIG. 9, when the magnification is changed to the low-power side, the second lens group G2 (the first correction lens group CG1) is moved to reduce the distance between the optical axes of the left and right variable power lens groups 3 (to bring close to the optical axis of the objective lens 1). Even if the first correction lens group CG1 is moved this way during the change in the magnification, the maximum diameter of the light entering the variable power lens groups 3 is smaller during the low-power than during the high-power as described above. Therefore, the light can be set within the lens effective diameter (maximum diameter that the light can enter) of the first lens group G1. As a result, the ray at the peripheral part among the rays passing through the objective lens 1 approaches the optical axis side of the objective lens 1, and the rejection of the ambient luminous flux in the low-power can be prevented.

It is desirable that the variable power lens group 3 is an afocal variable power optical system that changes the luminous flux diameter of the entering parallel luminous flux to eject the parallel luminous flux. Therefore, as the first correction lens group CG1 is decentered, the optical path in the variable power lens group 3 is changed, and the ejected luminous flux is deviated from the parallel luminous flux. The deviation needs to be corrected by moving at least one of the other lens groups (hereinafter, the lens group will be called a "second correction lens group CG2", and the lens group is the third lens group G3 in FIG. 8) to include components in the vertical direction of the optical axis to eject the light as a parallel luminous flux. The luminous flux entering the variable power lens group 3 is the maximum during the highest power. Therefore, during the highest power of the variable power lens group 3, it is desirable that the optical axes of all lens groups included in the variable power lens group 3 substantially match (substantially coincide with the optical axis A as a basis) to effectively use the entrance pupil of the variable power lens group 3.

(Second Embodiment)

In the parallel stereoscopic microscope, the variable power ratio of the variable power lens group 3 is changed to observe the sample (object). Not much resolving power is required to observe a relatively wide section of the sample at low-power, but high resolving power is required to enlarge and observe a narrower section at high-power. On the other hand, there is a high demand for stereoscopically viewing the sample by setting two observation optical systems for left and right eyes in the observation at low-power, but the stereoscopic vision is not much needed in the observation at high-power. Therefore, a second embodiment describes a microscope apparatus that includes a stereoscopic vision optical path for stereoscopically viewing the sample by two optical paths (observation optical systems 2) and a vertical vision optical path for improving the resolution of the image of the sample by one optical path (observation optical system 2') depending on the object of the observation (therefore, the light exited from the objective lens 1 is divided into three optical paths in total).

Figure 10:
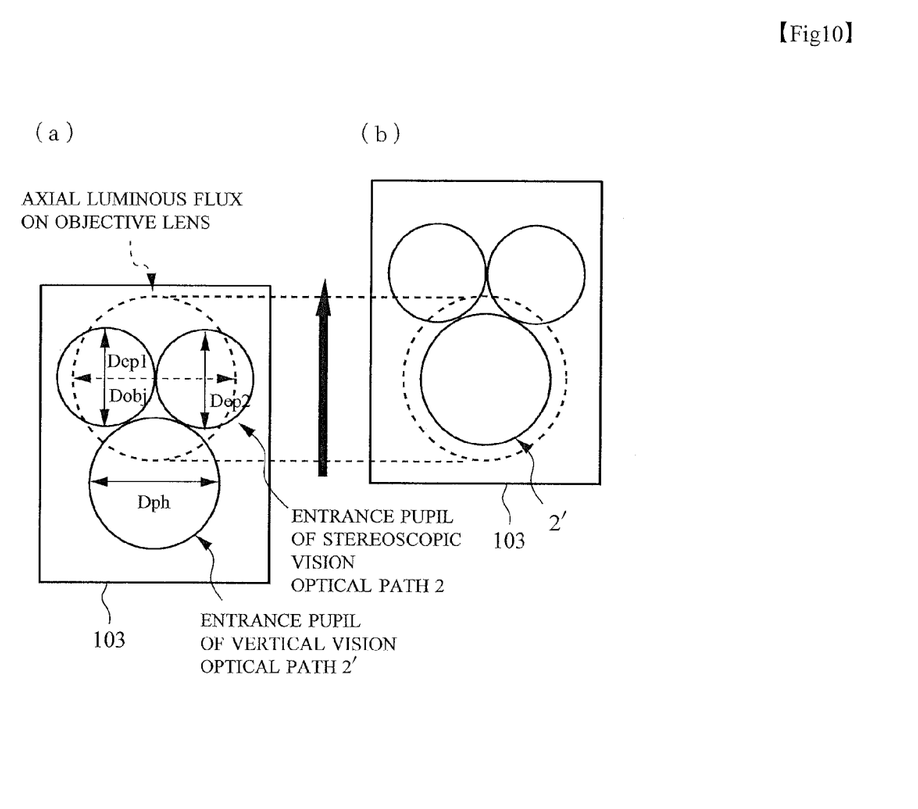
FIG. 10 shows explanatory views indicating a pupil aperture defined by the objective lens and pupil apertures defined by the variable power lens groups in a microscope apparatus according to a second embodiment, (a) showing a case in which a sample is observed by a stereoscopic vision optical path, (b) showing a case in which a sample is observed by a vertical vision optical path.
Figure 11:
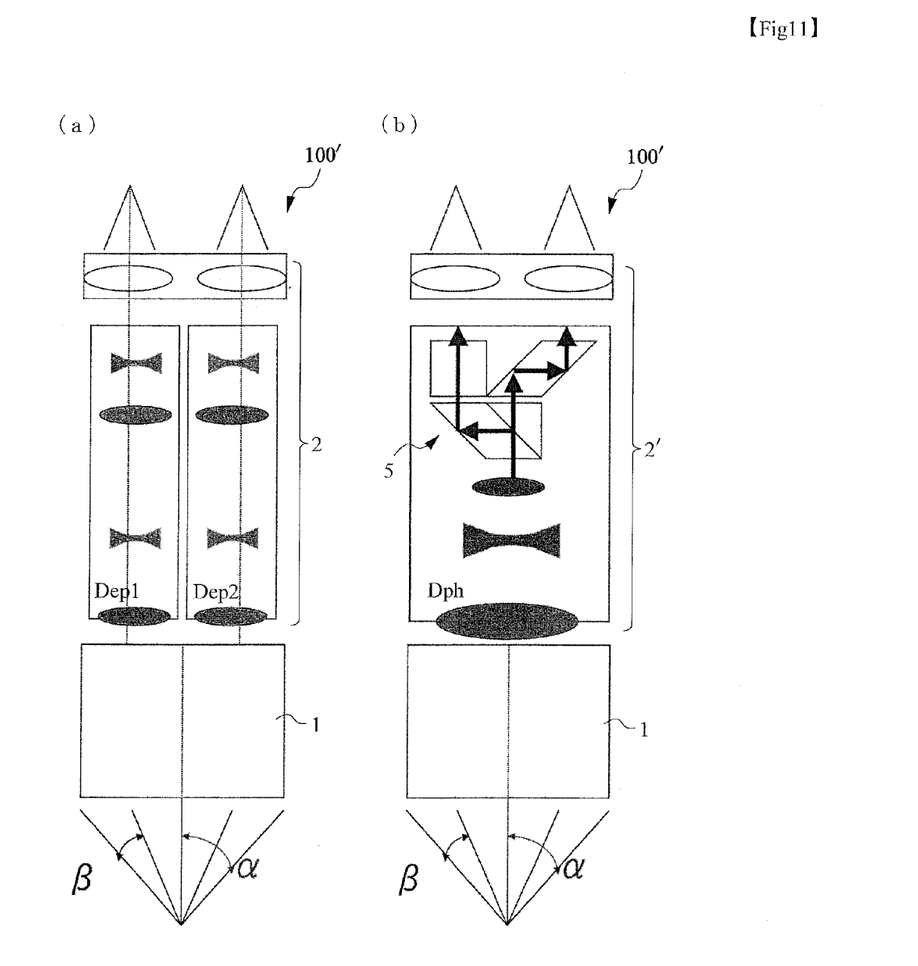
FIG. 11 shows explanatory views indicating configurations of an optical system of the microscope apparatus according to the second embodiment, (a) showing the stereoscopic vision optical path, (b) showing the vertical vision optical path.

A parallel microscope 100' according to the second embodiment shown in FIG. 10 includes the normal observation optical systems 2 arranged on the left and right of the optical axis of the objective lens 1 (hereinafter, also called "stereoscopic vision optical paths 2") as in the parallel stereoscopic microscope (microscope apparatus) 100 according to the first embodiment and also includes another optical path 2' for vertical vision in addition to the optical paths. In the microscope apparatus 100' with the configuration, the vertical vision optical path 2' is used not as an observation optical path, but as an illumination optical path in the stereoscopic vision observation of the sample using the left and right observation optical paths (stereoscopic vision optical paths 2) as shown in FIG. 10(*a*). This can prevent the self-fluorescence of glass caused by the illumination light from becoming noise. As shown in FIG. 10(*b*), if the entire variable power lens barrel 103 is moved relative to the optical axis of the objective lens 1 to bring the optical axis of the objective lens 1 in line with the optical axis of the vertical vision optical path 2', the vertical vision is possible. A prism element 5 for dividing the light for the binocular lens barrels as shown for example in FIG. 11(*b*) can be included in the vertical vision optical path 2' to smoothly switch the observation by both eyes for the stereoscopic vision and the vertical vision. As shown in FIG. 11(*a*), the mechanisms of the left and right optical path diameters (Dep1 and Dep2) are close to each other in the stereoscopic vision optical path 2, and the enlargement of one side interferes the other. Therefore, it is difficult to enlarge the optical path diameters. However, in the vertical vision optical path 2' shown in FIG. 11(*b*), there is no pair of optical paths that limits the optical path diameter (Dph), and the diameter can be easily enlarged. Therefore, a bright image with higher resolving power can be obtained. A bright image with higher resolving power than the normal stereoscopic microscope can be obtained when a condition of Dph>0.5Dobj is satisfied. Particularly, the sample can be observed by twice or more brightness during the fluorescence observation when a condition of Dph>0.6Dobj is satisfied.

As described, an object of the vertical vision optical path 2' is to improve the resolution. Therefore, it is desirable that the maximum diameter Dph of the entrance pupil of the vertical vision optical path 2' is the largest among the maximum diameters of the entrance pupils of the plurality of optical paths arranged in the microscope apparatus 100' (in the present embodiment, it is desirable that the maximum diameter Dph is greater than the entrance pupils Dep1 and Dep2 of the two stereoscopic vision optical paths 2).

REFERENCE SIGNS LIST

1 objective lens 2, 2' observation optical systems (optical paths)
3 variable power lens group 4 imaging lens 100, 100' parallel stereoscopic microscopes (microscope apparatuses)
CG1 (G2) first correction lens group
CG2 (G3) second correction lens group

The invention claimed is:

1. A microscope apparatus comprising, in order from an object:

an objective lens collecting light from the object; and optical systems forming two or more optical paths that are parallel to an optical axis of the objective lens and that are arranged so that light exited from the objective lens travels along the two or more optical paths, and all lens groups of the optical systems that are along an optical path of the two or more optical paths being rotational symmetric systems, wherein, when a sum of maximum diameters of entrance pupils of said optical systems forming any two optical paths among the two or more optical paths, and which have approximately the same shape and are arranged without overlapping each other, is set as ΣDi, and an axial luminous flux diameter determined from a maximum aperture angle $\alpha$ and a focal distance f of the objective lens is set as Dobj, a condition of the following expression is satisfied, ΣDi>Dobj where Dobj=2·f·sin $\alpha$.

2. The microscope apparatus according to claim 1, wherein the number of the optical paths is 2.

3. The microscope apparatus according to claim 1, wherein the number of the optical paths is 3.

4. The microscope apparatus according to claim 1, wherein a respective optical system of the optical systems forming at least one of the two or more optical paths comprises:

an afocal variable power optical system that ejects light, which is ejected substantially parallel to the optical axis of the objective lens from the objective lens, as a plurality of substantially parallel lights; and an imaging lens that collects the substantially parallel lights ejected from the afocal variable power optical system, wherein the afocal variable power optical system comprises, at at least part of a section for changing magnification from a high-power end state to a low-power end state, at least two lens groups that move to include components in a direction orthogonal to the optical axis of the objective lens.

5. The microscope apparatus according to claim 1, wherein the two or more optical paths are movable relative to the optical axis of the objective lens while a positional relationship of each other is maintained.

6. The microscope apparatus according to claim 5, wherein one of the two or more optical paths is used as an illumination optical path.

7. The microscope apparatus according to claim 5, wherein one of the two or more optical paths is movable to completely include the entire entrance pupil of an optical system of the optical systems forming a respective optical path within the axial luminous flux diameter of the objective lens.

8. The microscope apparatus according to claim 5, wherein a respective optical path of the two or more optical paths is movable to bring an optical axis of an optical system of said optical systems forming the respective optical path in line with the optical axis of the objective lens.

9. The microscope apparatus according to claim 8, wherein the maximum diameter of the entrance pupil of the optical system forming the respective optical path including the optical axis that can be brought in line with the optical axis of the objective lens is the largest among the maximum diameters of the entrance pupils of the optical systems forming the two or more optical paths.

10. A microscope apparatus comprising, in order from an object:

an objective lens collecting light from the object; and optical systems forming two or more optical paths that are parallel to an optical axis of the objective lens and that are arranged so that light exited from the objective lens travels along the two or more optical paths, wherein, when a sum of diameters passing through a center of the objective lens among maximum diameters of entrance pupils of said optical systems forming any two optical paths among the two or more optical paths, and which have approximately the same shape and are arranged without overlapping each other, is set as ΣDi', and an axial luminous flux diameter determined from a maximum aperture angle α and a focal distance f of the objective lens is set as Dobj, a condition of the following expression is satisfied, $$\Sigma Di' > Dobj$$

where Dobj=2·f·sin α.

11. The microscope apparatus according to claim 10, wherein the number of the optical paths is 2.

12. The microscope apparatus according to claim 10, wherein the number of the optical paths is 3.

13. The microscope apparatus according to claim 10, wherein the two or more optical paths are movable relative to the optical axis of the objective lens while a positional relationship of each other is maintained.

14. The microscope apparatus according to claim 10, wherein
   a respective optical system of the optical systems forming at least one of the two or more optical paths comprises:
      an afocal variable power optical system that ejects light, which is ejected substantially parallel to the optical axis of the objective lens from the objective lens, as a plurality of substantially parallel lights; and
      an imaging lens that collects the substantially parallel lights ejected from the afocal variable power optical system, and
   wherein the afocal variable power optical system comprises, at at least part of a section for changing magnification from a high-power end state to a low-power end state, at least two lens groups that move to include components in a direction orthogonal to the optical axis of the objective lens.

15. A microscope comprising, in order from an object:
   an objective lens that collects light from the object;
   a first optical system forming a first optical path that is parallel to an optical axis of the objective lens and that is arranged so that light exited from the objective lens travels along the first optical path,
   a second optical system forming a second optical path that is parallel to the first optical path and to the optical axis of the objective lens, and that is arranged so that light exited from the objective lens travels along the second optical path, wherein
   a sum of a maximum diameter of an entrance pupil of the first optical system and a maximum diameter of an entrance pupil of the second optical system is set as ΣDi,
   the entrance pupil of the first optical system and the entrance pupil of the second optical system have approximately the same shape and are arranged without overlapping each other,
   an axial luminous flux diameter determined from a maximum aperture angle α and a focal distance f of the objective lens is set as Dobj, and
   a condition of the following expression is satisfied, $$\Sigma Di > Dobj$$

where Dobj=2·f·sin α.

* * * * *